(12) United States Patent
Chopra et al.

(10) Patent No.: US 10,529,324 B1
(45) Date of Patent: Jan. 7, 2020

(54) GEOGRAPHICAL BASED VOICE TRANSCRIPTION

(71) Applicant: Cognistic, LLC, Gibsonia, PA (US)

(72) Inventors: Sanjay Chopra, Gibsonia, PA (US); Florian Metze, Pittsburgh, PA (US)

(73) Assignee: COGNISTIC, LLC, Gibsonia, PA (US)

( * ) Notice: Subject to any disclaimer, the term of this patent is extended or adjusted under 35 U.S.C. 154(b) by 0 days.

(21) Appl. No.: 15/391,783

(22) Filed: Dec. 27, 2016

(51) Int. Cl.
*G10L 15/183* (2013.01)
*G10L 15/16* (2006.01)
*G10L 21/0208* (2013.01)
*G10L 15/22* (2006.01)

(52) U.S. Cl.
CPC ............ *G10L 15/183* (2013.01); *G10L 15/16* (2013.01); *G10L 15/22* (2013.01); *G10L 21/0208* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 9,043,208 B2 * | 5/2015 | Koch | G10L 15/1822 | 704/231 |
| 9,530,408 B2 * | 12/2016 | Schroeter | G10L 15/20 | |
| 2006/0041427 A1 * | 2/2006 | Yegnanarayanan | G10L 15/063 | 704/235 |
| 2008/0091412 A1 * | 4/2008 | Strope | G10L 15/26 | 704/10 |
| 2009/0070102 A1 * | 3/2009 | Maegawa | G10L 15/183 | 704/9 |
| 2011/0184730 A1 * | 7/2011 | Lebeau | G10L 15/30 | 704/201 |
| 2011/0231191 A1 * | 9/2011 | Miyazaki | G01C 21/3608 | 704/243 |
| 2011/0313767 A1 * | 12/2011 | Duffield | G10L 15/187 | 704/251 |
| 2012/0095766 A1 * | 4/2012 | Han | G10L 15/197 | 704/255 |
| 2012/0265528 A1 * | 10/2012 | Gruber | G10L 15/18 | 704/235 |
| 2013/0346077 A1 * | 12/2013 | Mengibar | G10L 15/265 | 704/235 |
| 2014/0273979 A1 * | 9/2014 | Van Os | H04M 3/533 | 455/412.2 |
| 2014/0278416 A1 * | 9/2014 | Schuster | G10L 17/00 | 704/246 |
| 2014/0365221 A1 * | 12/2014 | Ben-Ezra | G10L 15/142 | 704/256.1 |
| 2015/0221305 A1 * | 8/2015 | Sharifi | G10L 15/26 | 704/235 |
| 2015/0287414 A1 * | 10/2015 | Tsujikawa | G10L 17/22 | 704/275 |
| 2015/0325254 A1 * | 11/2015 | Lee | G10L 17/22 | 704/231 |

(Continued)

*Primary Examiner* — Thuykhanh Le
(74) *Attorney, Agent, or Firm* — Ference & Associates LLC

(57) ABSTRACT

One embodiment provides a method, including: obtaining, using a processor, voice data; obtaining, using a processor, geographic location data; identifying, based on the geographic location data, a language model; and generating, using the language model, a textual representation of the voice data. Other aspects are described and claimed.

20 Claims, 4 Drawing Sheets

(56) References Cited

U.S. PATENT DOCUMENTS

| | | | |
|---|---|---|---|
| 2015/0336578 A1* | 11/2015 | Lord | B60T 17/22 |
| | | | 701/2 |
| 2016/0042733 A1* | 2/2016 | Yuan | H04W 4/021 |
| | | | 704/243 |
| 2016/0210551 A1* | 7/2016 | Lee | G06F 17/27 |
| 2016/0252972 A1* | 9/2016 | Kim | G10L 15/183 |
| | | | 704/9 |
| 2016/0358609 A1* | 12/2016 | Connell, II | G10L 15/075 |
| 2016/0365093 A1* | 12/2016 | Nissan | G10L 15/187 |
| 2016/0372107 A1* | 12/2016 | Dow | G06F 16/685 |
| 2017/0148432 A1* | 5/2017 | Jaramillo | G10L 15/26 |
| 2017/0154033 A1* | 6/2017 | Lee | G06F 17/218 |

\* cited by examiner

GEOGRAPHICAL BASED VOICE TRANSCRIPTION

BACKGROUND

Information handling devices ("devices" or "electronic devices"), for example laptop computers, smart phones, tablet devices, smart watches and other wearables, and the like, are utilized for many daily functions. As technology has advanced so too has the ways in which we interact with our electronic devices. For example, touch and voice controlled devices are becoming ubiquitous through society. In an effort to increase the usability of devices, manufacturers and designers have worked to make interfacing with a devices as seem less and comfortable as possible to a user.

Accordingly, voice/speech, as a means of device interaction, has taking great strides in usability. In order for an electronic device to carry out a task based on a voice command, the voice command must first be converted into a format that the electronic device can understand and process. In order to process voice data, some devices may request a user to enter sample voice data (e.g., reading a sentence during setup). Other alternative methods for increasing the accuracy of voice data transcription exist, but there still exists a lot of room for improvement.

BRIEF SUMMARY

In summary, one aspect provides a method, comprising: obtaining, using a processor, voice data; obtaining, using a processor, geographic location data; identifying, based on the geographic location data, a language model; and generating, using the language model, a textual representation of the voice data.

Another aspect provides an information handling device, comprising: a processor; a memory device that stores instructions executable by the processor to: obtain, using the processor, voice data; obtain, using the processor, geographic location data; identify, based on the geographic location data, a language model; and generate, using the language model, a textual representation of the voice data.

A further aspect provides a product, comprising: a storage device having code stored therewith, the code being executable by a processor and comprising: code that obtains voice data; code that obtains geographic location data; code that identifies, based on the geographic location data, a language model; and code that generates, using the language model, a textual representation of the voice data.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
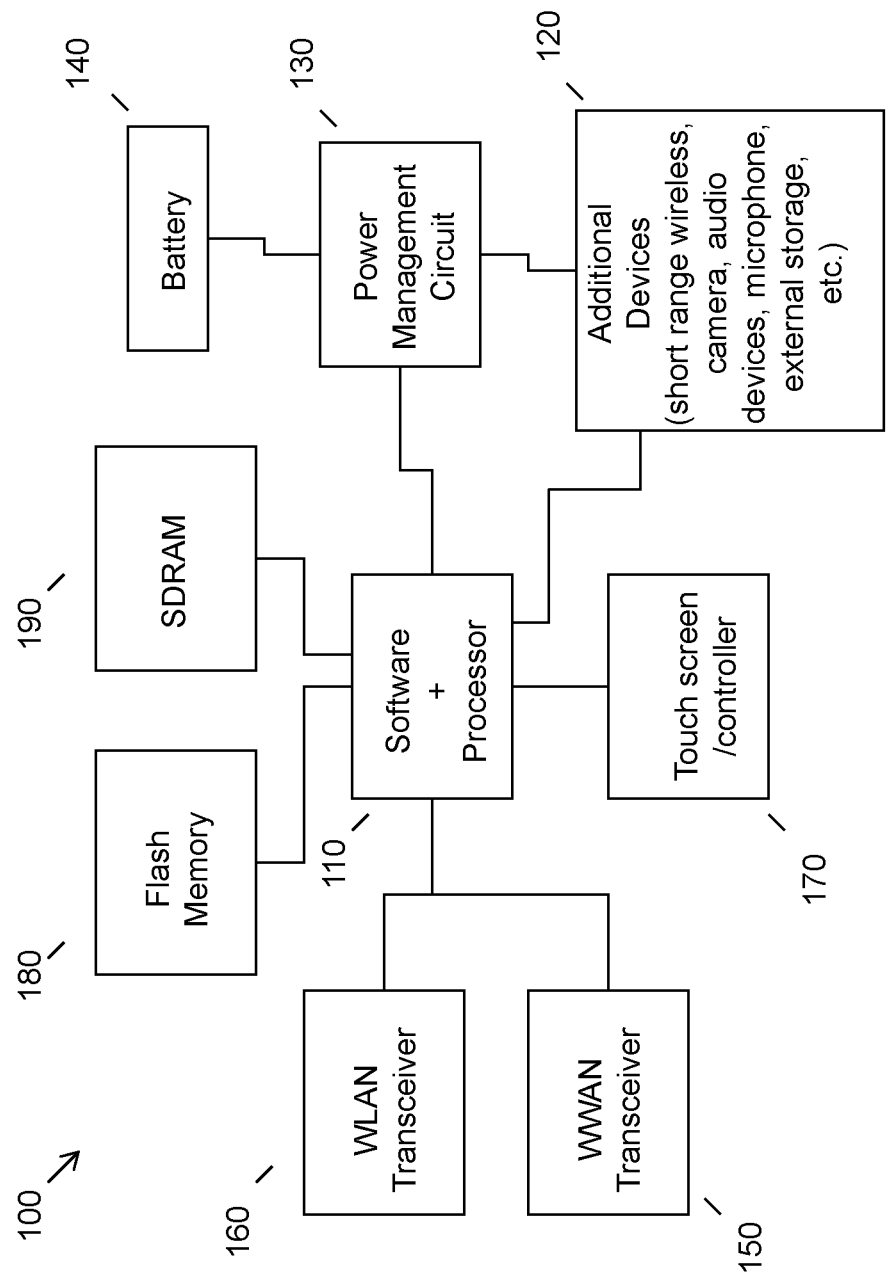
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As discussed herein, interacting with an electronic device via voice commands requires the conversation of voice data into a machine readable language. One use of this conversion may be to convert the voice data into text to display or transmit to another electronic device or user (e.g., using voice command to send a text message or email, transcribing received voice messages, etc.). Thus, the accuracy of voice transcription can be extremely important. This can be especially true in a business setting when a voicemail is transcribed, or when passing along critical information (e.g., an address, phone number, etc.)

Thus, a solution is needed that can further increase the accuracy of an electronic device's voice transcription service. In order to address that need, an embodiment provides a method of obtaining, using a processor, voice data (e.g., commands, information, communications, etc.). An embodiment then also obtains a geographic location or geographic location data related to a user or a user device. Based on the obtained geographic location data, an embodiment may select a geographically dependent language model to be used for the transcription. An embodiment may then, using the specific language model for the geographic location, generate a textual representing of the voice data.

In this way, an embodiment provides a technical improvement over the current state of the art in that it improves the functioning of an electronic device (e.g., smart phone, tablet, computer, etc.). This is because although a general language may be spoken across an entire country (e.g., English in the United States of America) it can have varying degrees of dialect in specific areas of the country. For example, those raised in the south (e.g., Alabama, Louisiana, etc.) may have a very different method of speaking that someone raised in the northeast (e.g., Massachusetts, New York, etc.). Thus, determining the geographic region allows an embodiment to select a more accurate automatic speech recognition (ASR) system for voice transcription.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and SDRAM 190.

Figure 2:
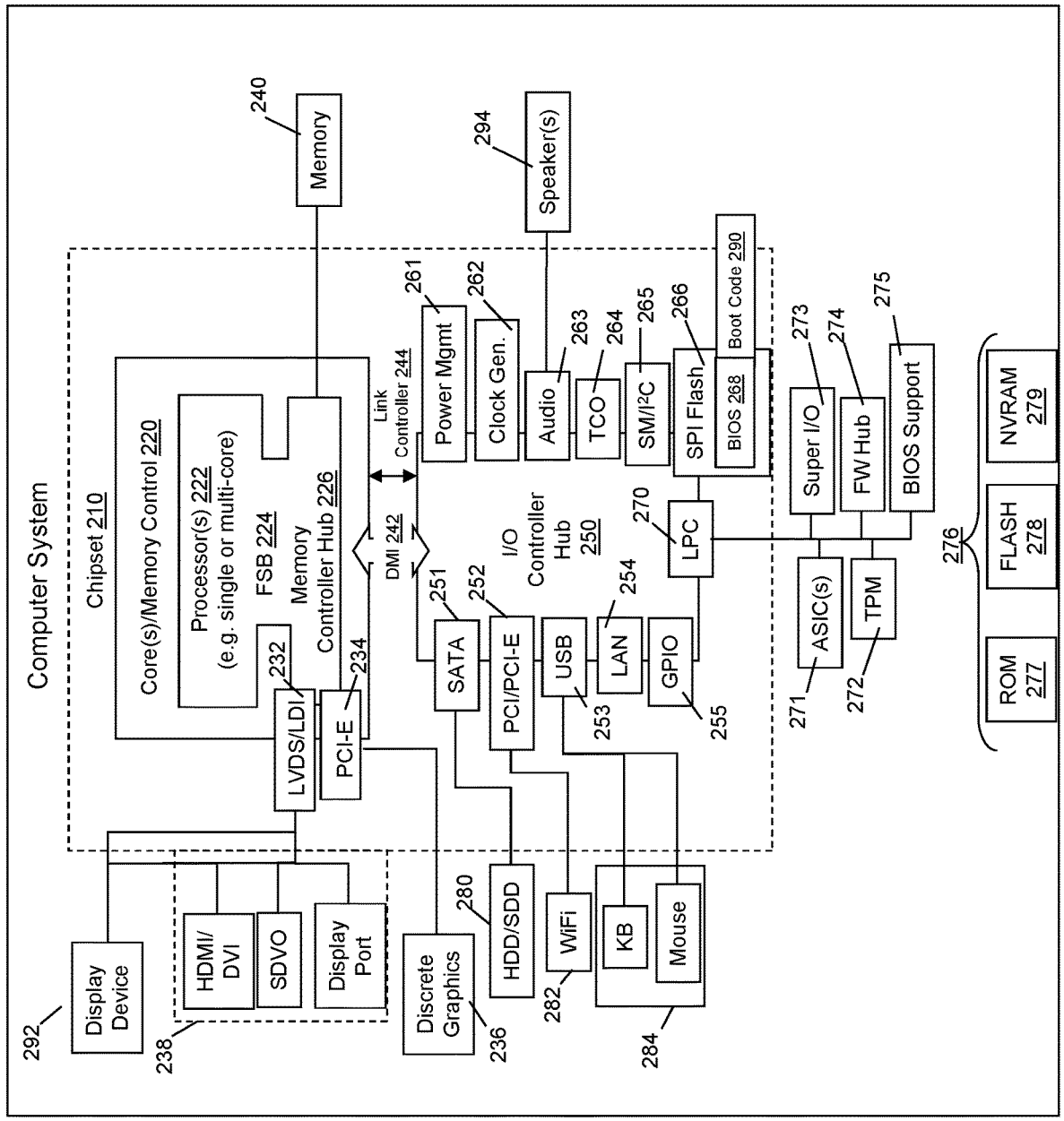
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which users may use for a variety of applications that can be enhanced via better prediction of voice commands. For example, the circuitry outlined in FIG. 1 may be implemented in a tablet or smart phone embodiment, whereas the circuitry outlined in FIG. 2 may be implemented in a personal computer embodiment.

Figure 3:
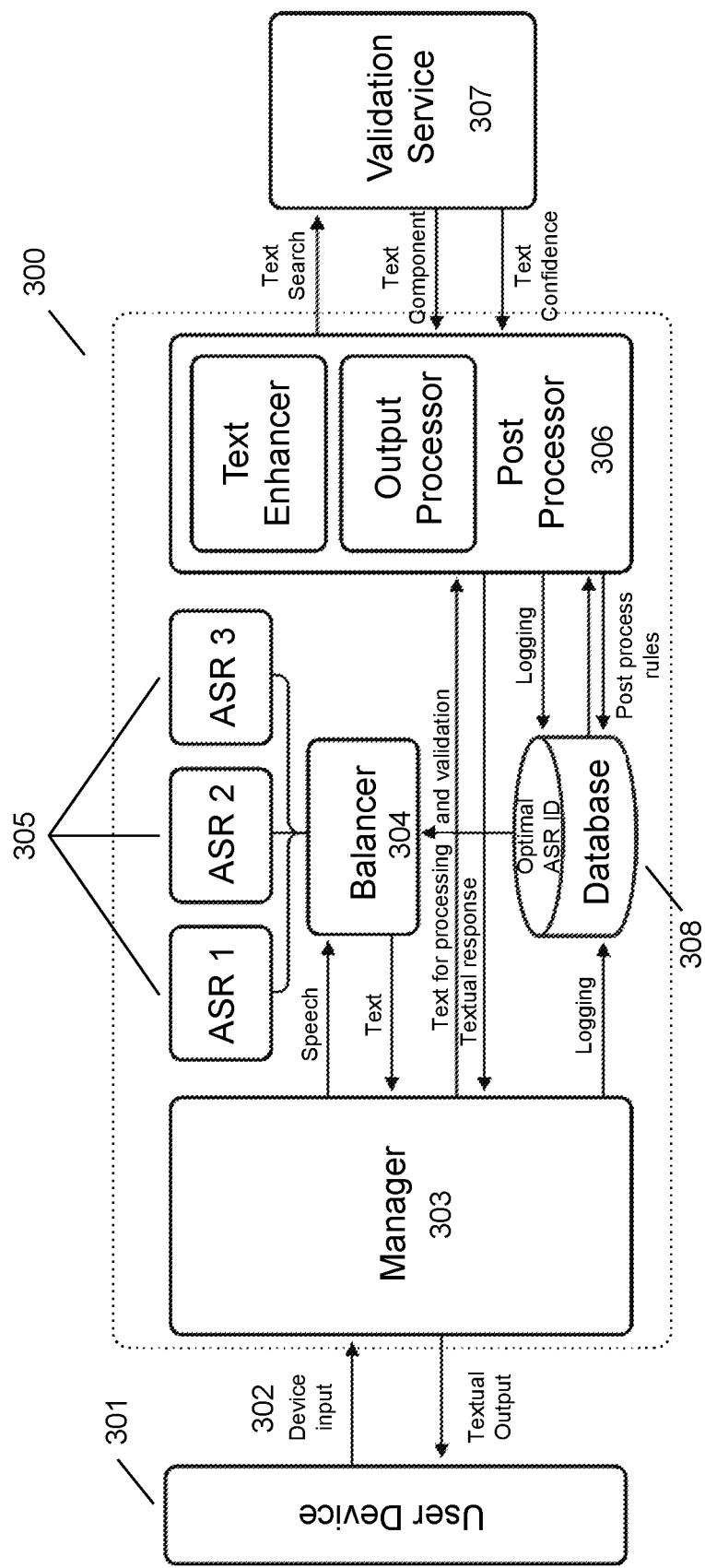
FIG. 3 illustrates an example method of geographical based voice transcription.

Referring now to FIG. 3, an example embodiment 300 may obtain from a user device 301, device input at 302. This device input may comprise user speech input as well as geographical input. The speech input, may be for example, a command to be processed, or a piece of information (e.g., an address, telephone number, etc.). The geographical input may be obtained from a user device in various ways. In one non-limiting embodiment, a user may manually enter (e.g., via a graphical user interface (GUI) interaction, speech input, etc.) their current geographical location. This user input may be received in real-time (e.g., each time a user enters voice input to be analyzed) or it could be requested by the device at a specific time (e.g., during setup of an application, at predetermined intervals, etc.)

Additionally or alternatively, in one embodiment, the geographical location information may be obtained by an electronic device using device sensors. For example, instead of requesting the information directly from a user, an electronic device may simply access the known location via one or more onboard sensors (e.g., Global Positioning System (GPS) sensor, Galileo sensor, Global Navigation Satellite System (GLONNASS) sensor, assisted GPS sensor, synthetic GPS sensor, cellular identification (CellID) sensor, Wi-Fi sensor, inertial sensor, barometric sensor, near field communication sensor, short range Wi-Fi (Bluetooth) sensor, terrestrial transmitter sensors, etc.).

Additionally or alternatively, in a further embodiment information about the phone a user is using to place the call may be used to determine a geographical location. For example, instead of requesting information directly from a user, caller identification information (i.e., Caller ID) may be used to obtain a geographical location. In the United States, the Caller ID information will provide the telephone number from which the user is calling and the area code of the telephone number may be used to provide a geographical location (i.e., the telephone number is associated with the Southern United States). Alternatively, it may be determined the telephone number from which a user is calling is associated with a preexisting account and a geographical location associated with the preexisting account may be used.

Thus, in one embodiment, the device input that is obtained via a manager 303 for analysis and processing may contain both user voice data and geographical location data obtained via a method discussed herein. The manager 303 then passes the speech information to a balancer 304 (e.g., an automatic speech recognition selection tool). Once the balancer has received the speech information, it may select a particular geographical specific automatic speech recognition (ASR) node (e.g., ASR 1, ASR 2, ASR 3, etc.) at 305. Thus, in an embodiment, an ASR or language model may be selected based on a determined geographical location obtained at the device input 302.

Once the appropriate ASR has been selected, an embodiment may convert the speech input into text and pass it back to the manager via the balancer 304. The ASR acoustic model may be implemented in any number of ways, including being based on convolutional neural networks and unidirectional or bidirectional long-short term memory neural networks. Moreover, the ASR(s) may utilize connectionist temporal classification training in order to improve their accuracy.

In one embodiment, once the conversion to a textual representation is complete, the manager 303 may receive the text version of the user speech. An embodiment may then, in order to increase accuracy, send the text for processing and validation. Thus, as shown in FIG. 3, the manager 303 sends the text to the post processor 306 for processing and validation. The post processor 306 may enhance the voice transcription and optimize it for validation using a validation service 307. The validation service 307 may be implemented in a variety of manners. Some non-limiting examples may be: a third party service that validates the textual information based on various factors; a cloud based server managed by an embodiment specifically for the user device 301 or similar user devices from one or more manufacturers; or locally stored and processed within the embodiment or user device.

Although it should be understood that the embodiments discussed throughout can apply to any form of speech input, for simplicity purposes, a non-limiting example based on address information is given herein. In this non-limiting example, an embodiment may receive an address in the form of device input 302 (e.g., speech input comprising an address). Based on the identified geographic location, determined via one of the methods discussed herein, a balancer 304 may select the appropriate ASR at 305 and the speech input may then be converted to a text based format. The text based format may then be passed to the post processor for enhancement based on a data base 308. The database may contain various information about ASR selection and/or the ASR(s) themselves (e.g., historical accuracy, associated geographic region, etc.).

In a further embodiment, the textual representation may be passed to a third party validation service. So, in the non-limiting example of an address being entered via voice input, the textual representation of the address may be sent to an address validation service (e.g., an address validation API). Address validation services are offered by various entities, for example, United Parcel Service (UPS), United States Postal Service (USPS), and the like. UNITED STATES POSTAL SERVICE is a registered trademark of United States Postal Service Independent Establishment Of The Executive Branch Of The Government Of The United States Of America in the United States of America and other countries. UNITED PARCEL SERVICE is a registered trademark of United Parcel Service of America, Inc. in the United States and other countries, Once the address is validated via the validation service at 307, an updated textual component as well as a confidence level/score of the textual representation is sent back to the post processor 306. Based on these returned values, the post processor 306 may update the database 308 with new post process rules or guidelines. Keeping the database 308 up-to-date helps ensure the most accurate selection of ASR(s) and thus the most accurately generated textual representation.

Figure 4:
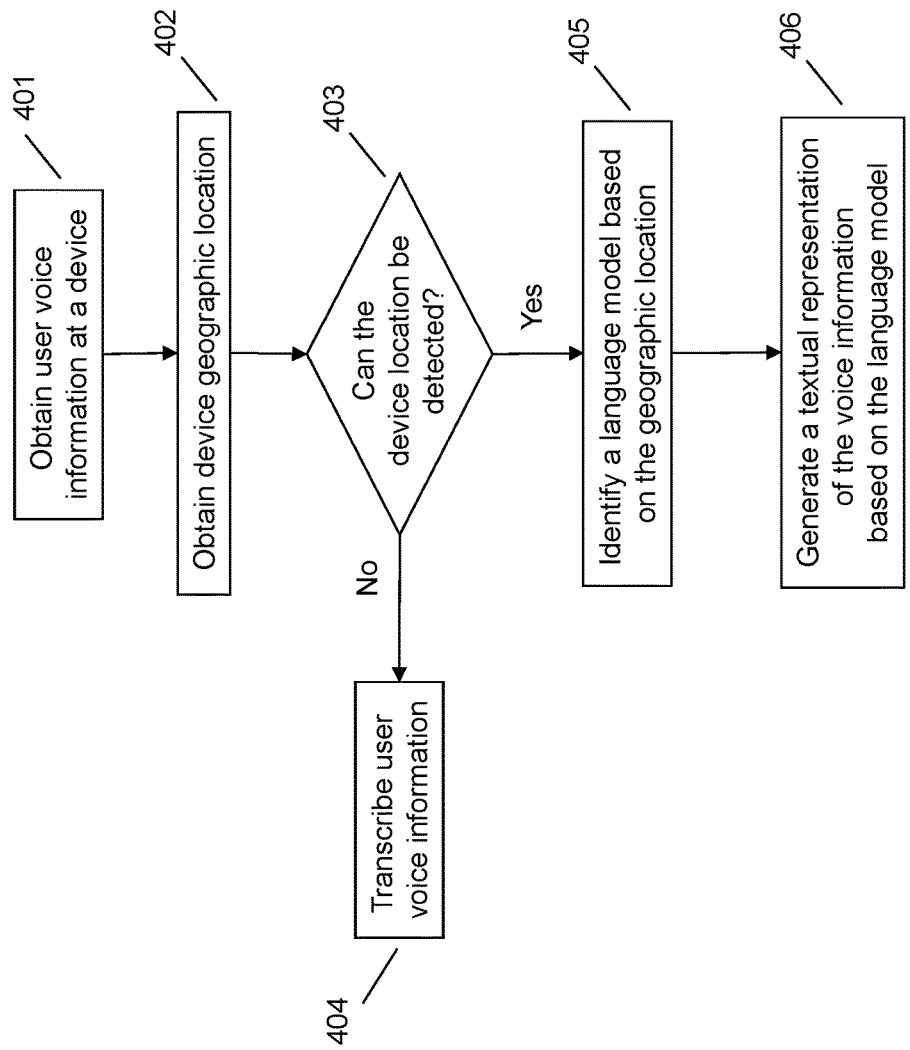
FIG. 4 illustrates another example method of geographical based voice transcription.

Referring now to FIG. 4, an embodiment may obtain, using a processor voice data/information from a device (e.g., smartphone, tablet, laptop, etc.) at 401. In one embodiment, the obtained voice data may contain various extraneous/ambient noises (e.g., crowd noise, television/radio noise, wind noise, etc.). Thus, an embodiment may, in order to improve recognition, filter the extraneous/ambient noise from the voice data. It should be understood by one skilled in the art, that any form of noise reduction known at the time may be used to improve speech recognition.

In addition to the voice data, an embodiment may also receive geographical location data at 402. The reception of the geographical location data may be prior to obtaining the voice data, substantially simultaneous to obtaining the voice data, or after obtaining the voice data. In one embodiment, the geographical location data is obtained based on user input. For example, if a user prompts their device to receive voice input for transformation, the device may request form the user location information (e.g., a postal code, street address, building number, etc.).

Additionally or alternatively, an embodiment may obtain the geographical information from one or more electronic device sensors, as discussed herein. In a further embodiment, the geographical information may be contained within the voice data. For example, if the user speaks an address, an initial textual representation may be generated to determine an associated location, and then the determined location may be used for proper selection of an ASR.

Furthermore, an embodiment may obtain the geographical location data based on data associated with the device such as a telephone number (e.g., area code in the United States, city codes and the like in other countries, etc.) as discussed herein, information given when an account used on the device is opened (e.g., Apple ID, Gmail, Facebook, a cloud based backup service, etc.), etc. For example, the area code of a mobile phone's telephone number may indicate that the phone is based in the Southern United States.

Thus, an embodiment may determine if any geographical information is known about the device or user at 403. If no location can be determined, the obtained voice information at 401 is simply transcribed using the default or general ASR at 404. However, if location information can be determined at 403, an embodiment may then identify a language model based on the geographical location information at 405.

Using the identified ASR, an embodiment may then generate a textual representation of the voice information based on the selected language model at 406. The automatic speech recognition module (ASR) may be implemented in any number of ways, including utilizing convolutional neural networks and unidirectional or bidirectional long-short term memory neural networks.

In one embodiment, a confidence score may be calculated for the generated textual representation at 406. This confidence score may be based off of historical statistical information. In one embodiment, as generally discussed herein, the database (308 of FIG. 3) may store relevant information regarding the post processing and validation step. Based on the historic accuracy of one or more of the ASR(s), the information contained within the database may be used to generate the confidence score of the generated textual representation.

The calculated confidence scores may be used to improve the accuracy of the textual representation generation. For example, an embodiment may generate a plurality of textual representations of the voice data using a different language model for each representation. Thus, various ASR(s) may be utilized to generate the textual representation at 406, and each is assigned an individual confidence score. In a further embodiment, an algorithm may be used to narrow or select the proper ASR based on the determined confidence score.

In a further embodiment, the plurality of textual representations may be passed to a validation service, as discussed herein. The validation service may determine the accuracy of each of the plurality of textual representations and return them to the post processor. An embodiment may then, based on the validation service's determination, adjust or update the algorithm used for calculating the confidence score and/or selecting the proper ASR.

The various embodiments described herein thus represent a technical improvement to a computer system, increasing the ability of a device to operate using voice or speech input via one of the processes discussed herein. Specifically, obtaining user voice data at an information handling device; obtaining geographical information relating to the user or the user's device; identifying a proper language model from a plurality of geographic specific language models; and generating a textual representation of the obtained voice information based on the identified language model.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
obtaining, using a processor, voice data;
obtaining, from a plurality of device sensors and using a processor, geographic location data, wherein at least a portion of the geographic location data is obtained from the voice data, wherein the geographic location data is obtained in real-time as the voice data is obtained;
identifying, based on the geographic location data, a geographically dependent automatic speech recognition tool that is based upon a language model associated with a geographic location identified from the geographic location data, wherein the language model is based upon a dialect of a language associated with the geographical location, and wherein the identifying comprises selecting, using a balancer, an automatic speech recognition tool from a plurality of automatic speech recognition tools for the geographic location based at least in part on a historical accuracy of the plurality of automatic speech recognition tools, wherein the geographically dependent automatic speech recognition tool comprises a neural network that utilizes classification training to improve the accuracy of the geographically dependent automatic speech recognition tool;
generating a textual representation of the voice data by converting the voice data to a textual representation using the geographically dependent automatic speech recognition tool; and
receiving, from a third party validation service, validation of the textual representations.

2. The method of claim 1, wherein the geographical location data is obtained from at least one of: user input, an electronic device sensor, and information contained within the voice data.

3. The method of claim 1, further comprising calculating a confidence score for the generated textual representation of the voice data.

4. The method of claim 1, further comprising generating a plurality of textual representations of the voice data, each textual representation being based on a new language model.

5. The method of claim 4, further comprising calculating, based on an algorithm, a confidence score for each of the plurality of textual representations of the voice data.

6. The method of claim 5, further comprising:
adjusting, based on the validation, the algorithm used for calculating the confidence score.

7. The method of claim 1, wherein the generating further comprises: converting, using an automatic speech recognition module, voice data into text based on the identified language model.

8. The method of claim 7, wherein the automatic speech recognition module utilizes at least one of: bidirectional long term memory neural networks and bidirectional short term memory neural networks.

9. The method of claim 1, further comprising filtering, using a processor, ambient noise from the voice data.

10. The method of claim 1, further comprising, validating the textual representation of the voice data using an external service.

11. An information handling device, comprising:
a processor;
a memory device that stores instructions executable by the processor to:
obtain, using the processor, voice data;
obtain, from a plurality of device sensors and using the processor, geographic location data, wherein at least a portion of the geographic location data is obtained from the voice data, wherein the geographic location data is obtained in real-time as the voice data is obtained;
identify, based on the geographic location data, a geographically dependent automatic speech recognition tool that is based upon a language model associated with a geographic location identified from the geographic location data, wherein the language model is based upon a dialect of a language associated with the geographical location, and wherein the identifying comprises selecting, using a balancer, an automatic speech recognition tool from a plurality of automatic speech recognition tools for the geographic location based at least in part on a historical accuracy of the plurality of automatic speech recognition tools, wherein the geographically dependent automatic speech recognition tool comprises a neural network that utilizes classification training to improve the accuracy of the geographically dependent automatic speech recognition tool;
generate a textual representation of the voice data by converting the voice data to a textual representation using the geographically dependent automatic speech recognition tool; and
receive, from a third party validation service, validation of the textual representations.

12. The information handling device of claim 11, wherein the geographical location data is obtained from at least one of: user input, an electronic device sensor, and information contained within the voice data.

13. The information handling device of claim 11, further comprising calculating a confidence score for the generated textual representation of the voice data.

14. The information handling device of claim 11, further comprising generating a plurality of textual representations of the voice data, each textual representation being based on a new language model.

15. The information handling device of claim 14, further comprising calculating, based on an algorithm, a confidence score for each of the plurality of textual representations of the voice data.

16. The information handling device of claim 15, further comprising:
adjusting, based on the validation, the algorithm used for calculating the confidence score.

17. The information handling device of claim 11, wherein the generating further comprises:
converting, using an automatic speech recognition module, voice data into text based on the identified language model; and
wherein the automatic speech recognition module utilizes at least one of: bidirectional long term memory neural networks and bidirectional short term memory neural networks.

18. The information handling device of claim 11, further comprising filtering, using a processor, ambient noise from the voice data.

19. The information handling device of claim 11, further comprising, validating the textual representation of the voice data using an external service.

20. A product, comprising:
a storage device having code stored therewith, the code being executable by a processor and comprising:
code that obtains voice data;
code that obtains from a plurality of device sensors geographic location data, wherein at least a portion of the geographic location data is obtained from the voice data, wherein the geographic location data is obtained in real-time as the voice data is obtained;

code that identifies, based on the geographic location data, a geographically dependent automatic speech recognition tool that is based upon a language model associated with a geographic location identified from the geographic location data, wherein the language model is based upon a dialect of a language associated with the geographical location, and wherein the identifying comprises selecting, using a balancer, an automatic speech recognition tool from a plurality of automatic speech recognition tools for the geographic location based at least in part on a historical accuracy of the plurality of automatic speech recognition tools, wherein the geographically dependent automatic speech recognition tool comprises a neural network that utilizes classification training to improve the accuracy of the geographically dependent automatic speech recognition tool;

code that generates a textual representation of the voice data by converting the voice data to a textual representation using the geographically dependent automatic speech recognition tool; and code that receives, from a third party validation service, validation of the textual representations.

* * * * *